United States Patent
Teetzel et al.

(10) Patent No.: US 10,162,168 B2
(45) Date of Patent: Dec. 25, 2018

(54) BINOCULAR BRIDGE FOR THERMAL VIEWING DEVICE

(71) Applicant: Wilcox Industries Corp., Newington, NH (US)

(72) Inventors: James W. Teetzel, Portsmouth, NH (US); Travis S. Mitchell, Dover, NH (US); Nathaniel G. Wright, Rye, NH (US)

(73) Assignee: Wilcox Industries Corp., Newington, NH (US)

(*) Notice: Subject to any disclaimer, the term of this patent is extended or adjusted under 35 U.S.C. 154(b) by 0 days.

(21) Appl. No.: 14/242,303

(22) Filed: Apr. 1, 2014

(65) Prior Publication Data

US 2014/0327962 A1    Nov. 6, 2014

Related U.S. Application Data

(60) Provisional application No. 61/819,199, filed on May 3, 2013.

(51) Int. Cl.
*F41G 11/00* (2006.01)
*G02B 23/12* (2006.01)
(Continued)

(52) U.S. Cl.
CPC ............ *G02B 23/18* (2013.01); *F41G 11/003* (2013.01); *G02B 23/125* (2013.01);
(Continued)

(58) Field of Classification Search
CPC .. G02B 23/12; G02B 23/125; G02B 27/0176; G02B 2027/0156; F41G 11/003; A42B 3/042; A42B 1/247
See application file for complete search history.

(56) References Cited

U.S. PATENT DOCUMENTS 5,446,585 A    8/1995   Morley et al.
5,471,678 A   12/1995   Dor
              (Continued)

FOREIGN PATENT DOCUMENTS

AU      349602       7/2013
EP      0545721 A1   4/1992
              (Continued)

OTHER PUBLICATIONS

UK Search Report received in GB1406466.1 dated Sep. 19, 2014.
(Continued)

*Primary Examiner* — Cara E Rakowski
(74) *Attorney, Agent, or Firm* — McLane Middleton, Professional Association

(57) ABSTRACT

An improved monocular/binocular bridge and helmet mounting device employing same for an optical device are provided. The mounting device herein includes a mount with a bridge attachment for providing multiple options for a monocular or binocular viewing. An adjustment mechanism for adjusting the pupillary/interpupillary positioning of attached viewing device(s) moves the devices linearly from side-to-side. Multiple options are provided for moving attached devices to any of multiple stowed positions out of the user's line of sight when the optical device is not in use. The bridge attachment and multiple stow positions also allow the unit to be adapted for a variety of viewing devices. A mounting bracket on the viewing device allows the viewing device to be selectively attached to a helmet mount or firearm accessory mounting rail.

18 Claims, 13 Drawing Sheets

(51) Int. Cl.
*G02B 23/18* (2006.01)
*G02B 27/01* (2006.01)

(52) U.S. Cl.
CPC .. *G02B 27/0176* (2013.01); *G02B 2027/0138* (2013.01); *G02B 2027/0156* (2013.01)

(56) References Cited

U.S. PATENT DOCUMENTS

| | | | |
|---|---|---|---|
| 5,786,932 A | 7/1998 | Pniel | |
| 6,462,867 B2 | 10/2002 | Choinere | |
| 6,462,894 B1 | 10/2002 | Moody | |
| 6,493,137 B1 | 12/2002 | Solinsky et al. | |
| 6,662,370 B1 | 12/2003 | Buchanan | |
| 6,924,931 B1 | 8/2005 | Lam et al. | |
| 7,219,370 B1* | 5/2007 | Teetzel et al. | 2/6.2 |
| 8,029,780 B2 | 10/2011 | Kollet et al. | |
| 8,375,473 B2 | 2/2013 | Celona et al. | |
| 8,739,313 B2 | 6/2014 | Teetzel et al. | |
| 9,116,355 B2 | 8/2015 | Teetzel et al. | |
| 2004/0181856 A1 | 9/2004 | Oleson | |
| 2006/0007562 A1* | 1/2006 | Willey et al. | 359/811 |
| 2007/0214551 A1 | 9/2007 | Teetzel et al. | |
| 2008/0170838 A1 | 7/2008 | Teetzel et al. | |
| 2011/0145981 A1* | 6/2011 | Teetzel et al. | 2/422 |
| 2011/0239354 A1* | 10/2011 | Celona et al. | 2/422 |
| 2012/0167441 A1 | 7/2012 | Holmberg | |
| 2012/0200917 A1 | 8/2012 | Rivkin et al. | |
| 2013/0083391 A1 | 4/2013 | Teetzel et al. | |
| 2015/0002930 A1 | 1/2015 | Teetzel et al. | |
| 2015/0323779 A1 | 11/2015 | Teetzel et al. | |

FOREIGN PATENT DOCUMENTS

| | | |
|---|---|---|
| GB | 2267764 A | 12/1993 |
| WO | 2002/023249 A1 | 3/2002 |
| WO | 2011132163 A1 | 10/2011 |
| WO | 2014/164203 A1 | 10/2014 |

OTHER PUBLICATIONS

Teetzel et al., U.S. Appl. No. 13/930,534, filed Jun. 28, 2013.
ITL Optronics Ltd., "Mini N/SEAS Family" (Jan. 15, 2009).
UK Search Report dated Jun. 1, 2017 received in UK application No. GB1406466.1.

* cited by examiner

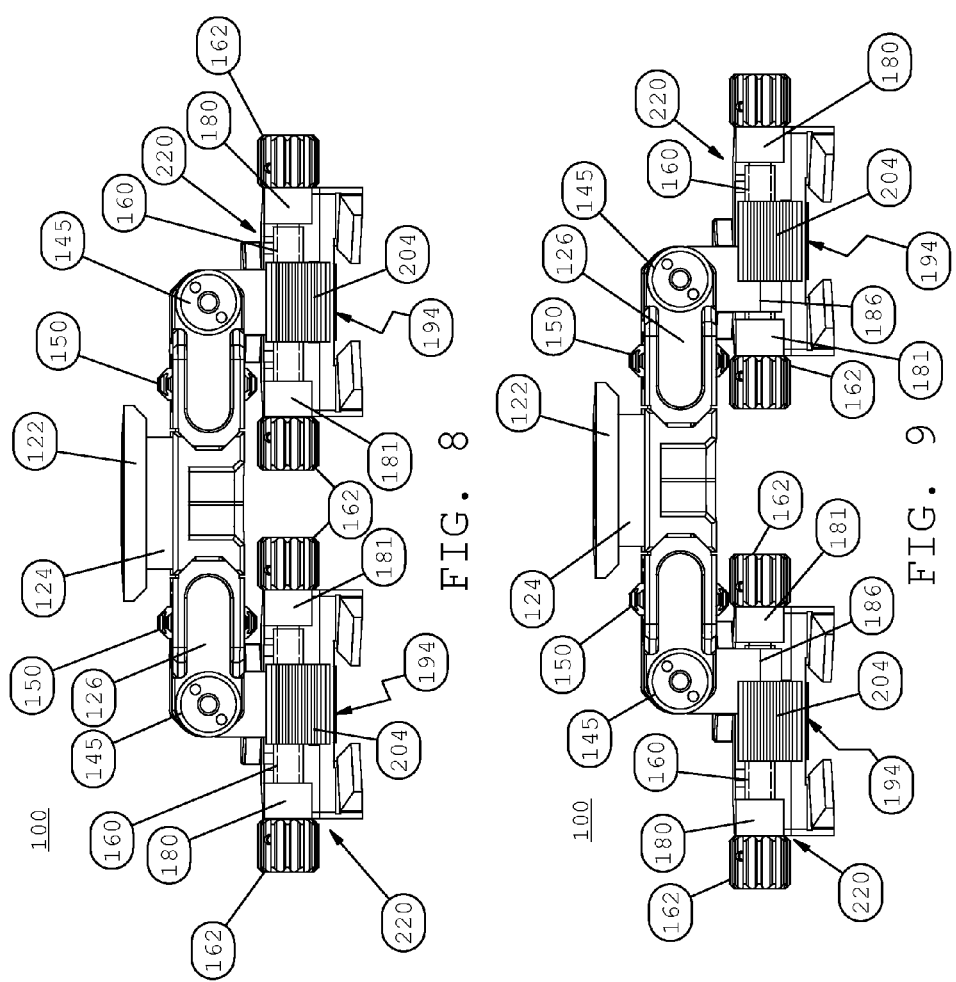

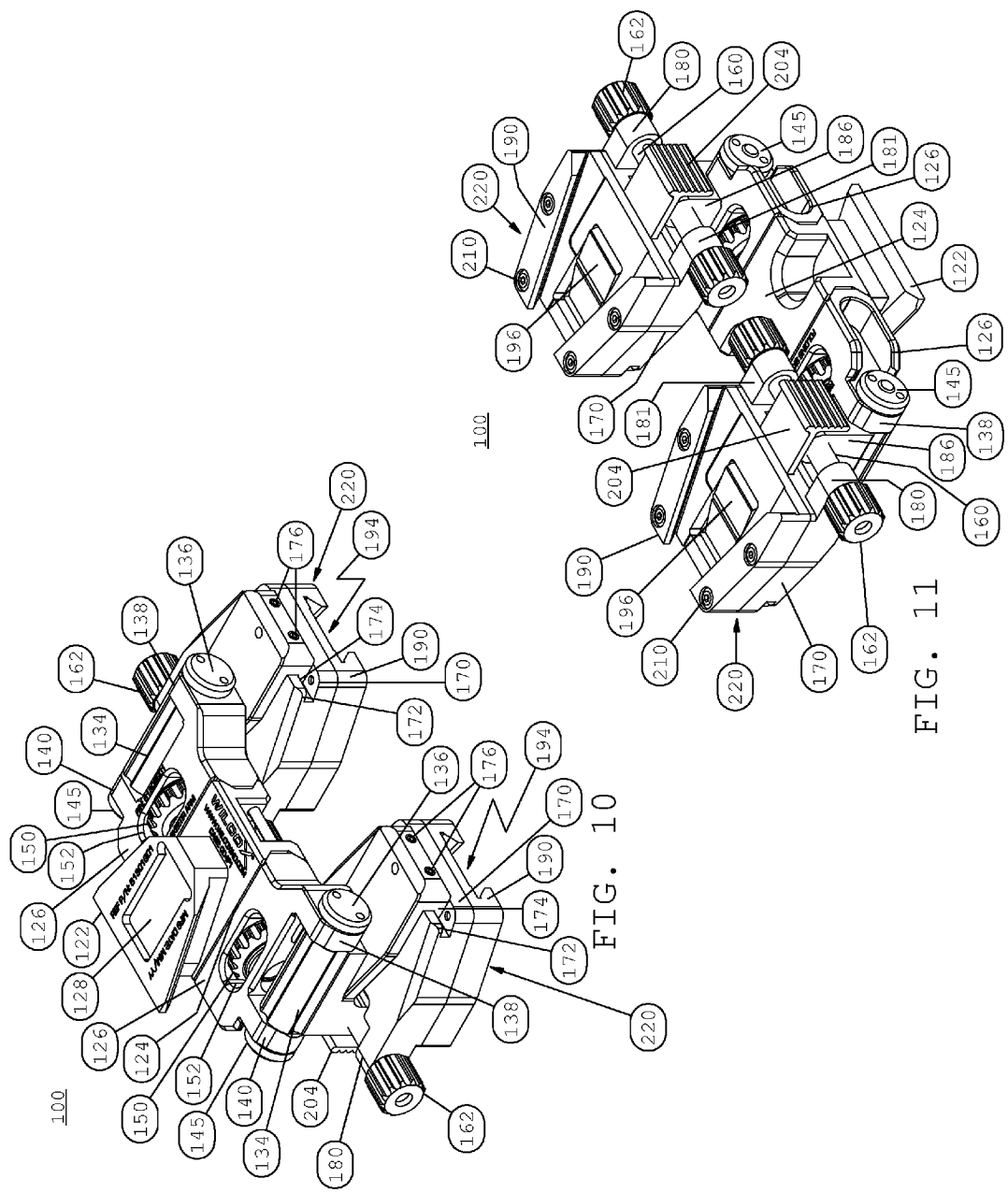

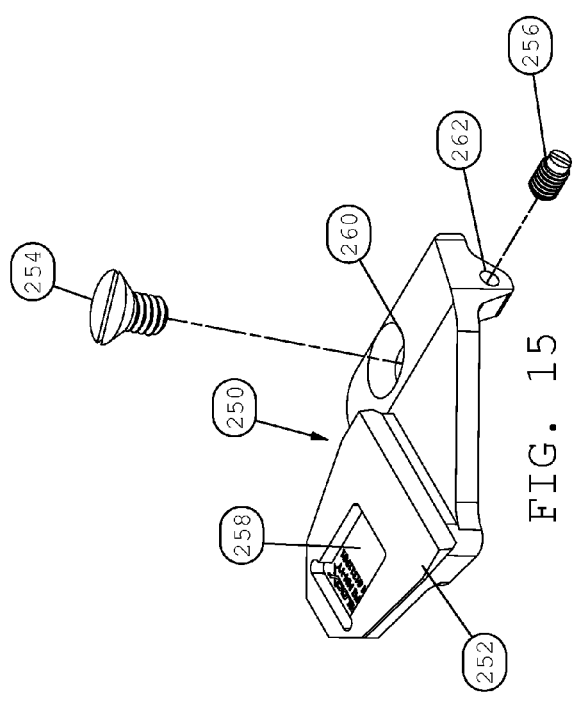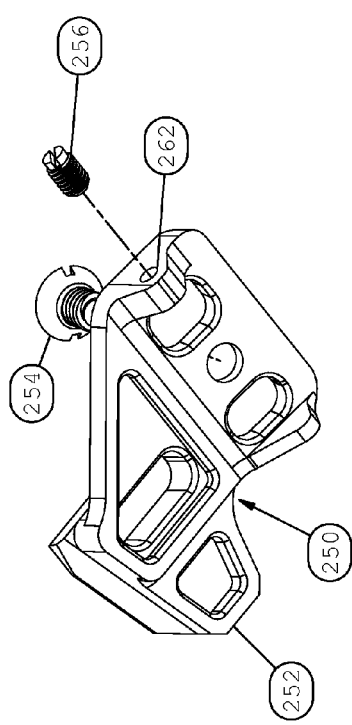

BINOCULAR BRIDGE FOR THERMAL VIEWING DEVICE

CROSS REFERENCE TO RELATED APPLICATION

This application claims priority to U.S. Provisional Application No. 61/819,199 filed May 3, 2013. The aforementioned provisional application is incorporated herein by reference in its entirety.

BACKGROUND

The present disclosure relates to an improved system for mounting a viewing device to headgear such as a tactical or military field helmet, and specifically, a mount and a bridge attachment for same. The bridge unit herein provides multiple options for a monocular or binocular viewing device and multiple flip options for moving an attached viewing device between a viewing position when the device is in use and a flipped or stowed position out of the user's line of sight when the viewing device is not in use. The bridge unit is adapted to removably attach one or two viewing devices, which may be the same or different. The bridge according to this disclosure is particularly suited for use with a thermographic camera device or other device which employs a display screen, although it will be recognized that the bridge herein could be adapted for use with any type of optical, opto-electronic, or electronic viewing device, including without limitation, night vision devices that enable viewing under nighttime or other low light conditions, such as a night vision goggle (NVG) device or enhanced night vision goggle (ENVG) device, thermal imaging device, short wave infra-red (SWIR) device, camera, head mounted display screen, and so forth.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIGS. 8 and 9 are enlarged, front views of the bridge unit illustrating the lateral movement of the device mounts.

FIG. 10 is an enlarged isometric view of the bridge unit taken generally from the rear, top and user's left side.

FIG. 11 is an enlarged isometric view of the bridge unit taken generally from the front, bottom and user's left side.

FIGS. 15 and 16 are enlarged, exploded top and bottom isometric views, respectively, of the mounting shoe adapter appearing in FIGS. 10 and 11.

DETAILED DESCRIPTION OF THE PREFERRED EMBODIMENTS

Figure 1:
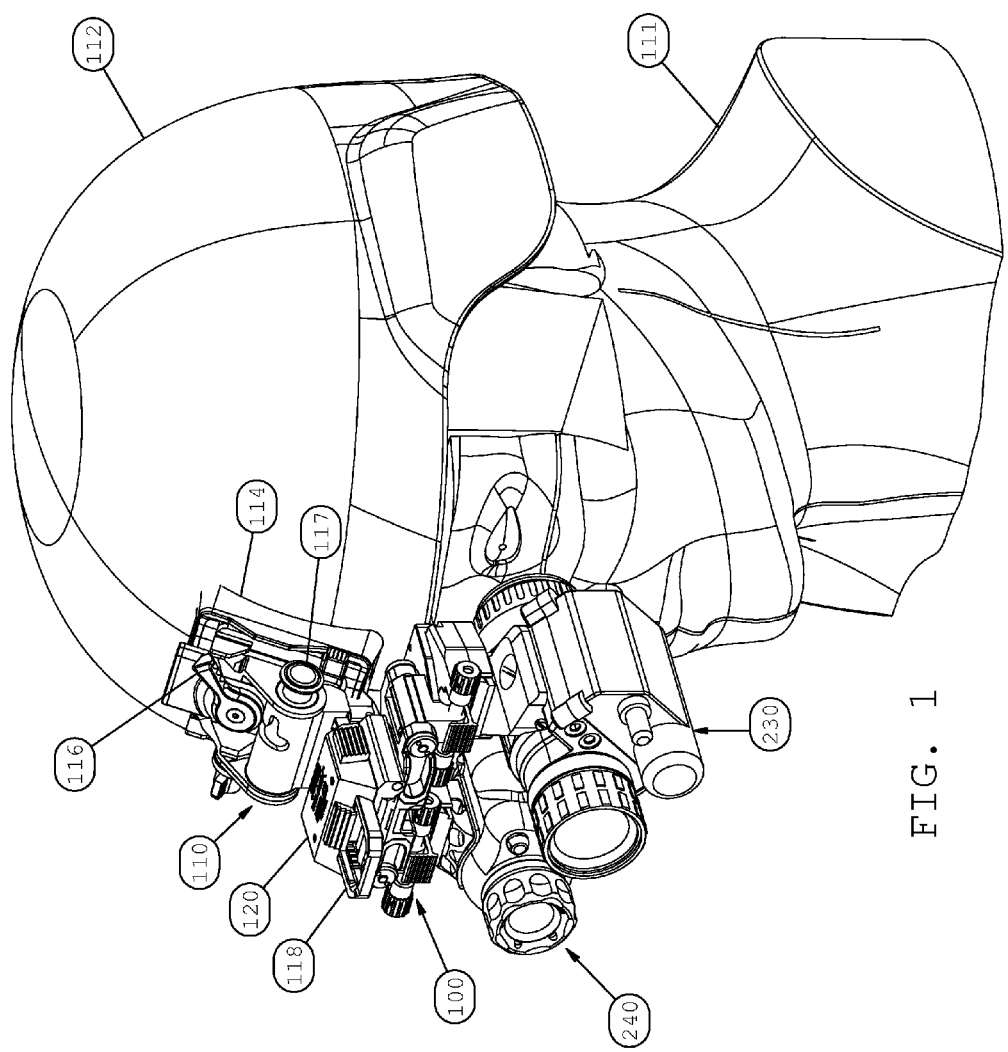
FIG. 1 is an isometric view of an exemplary embodiment binocular bridge herein used in conjunction with a helmet mount and a pair of viewing devices.
Figure 2:
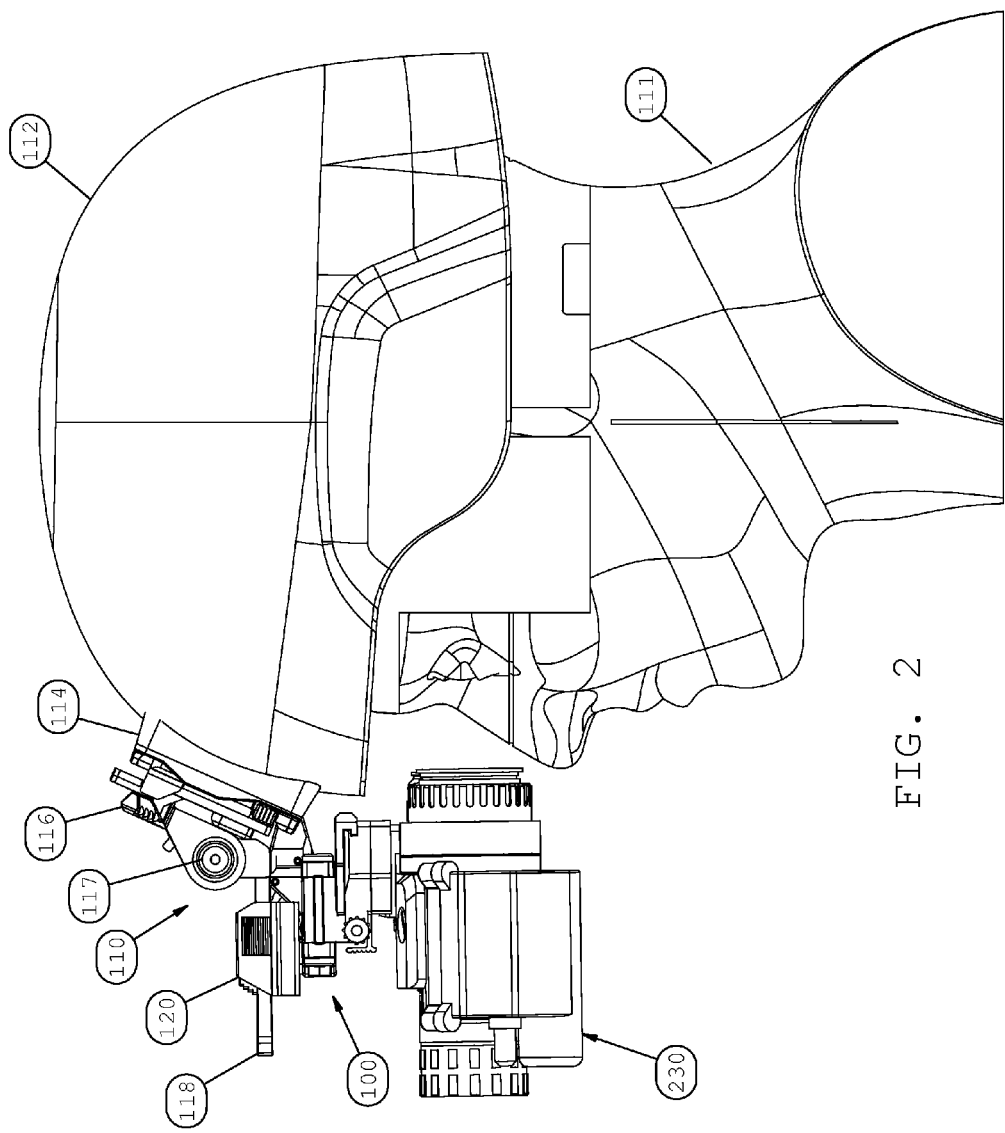
FIG. 2 is a side view of the embodiment appearing in FIG. 1.
Figure 3:
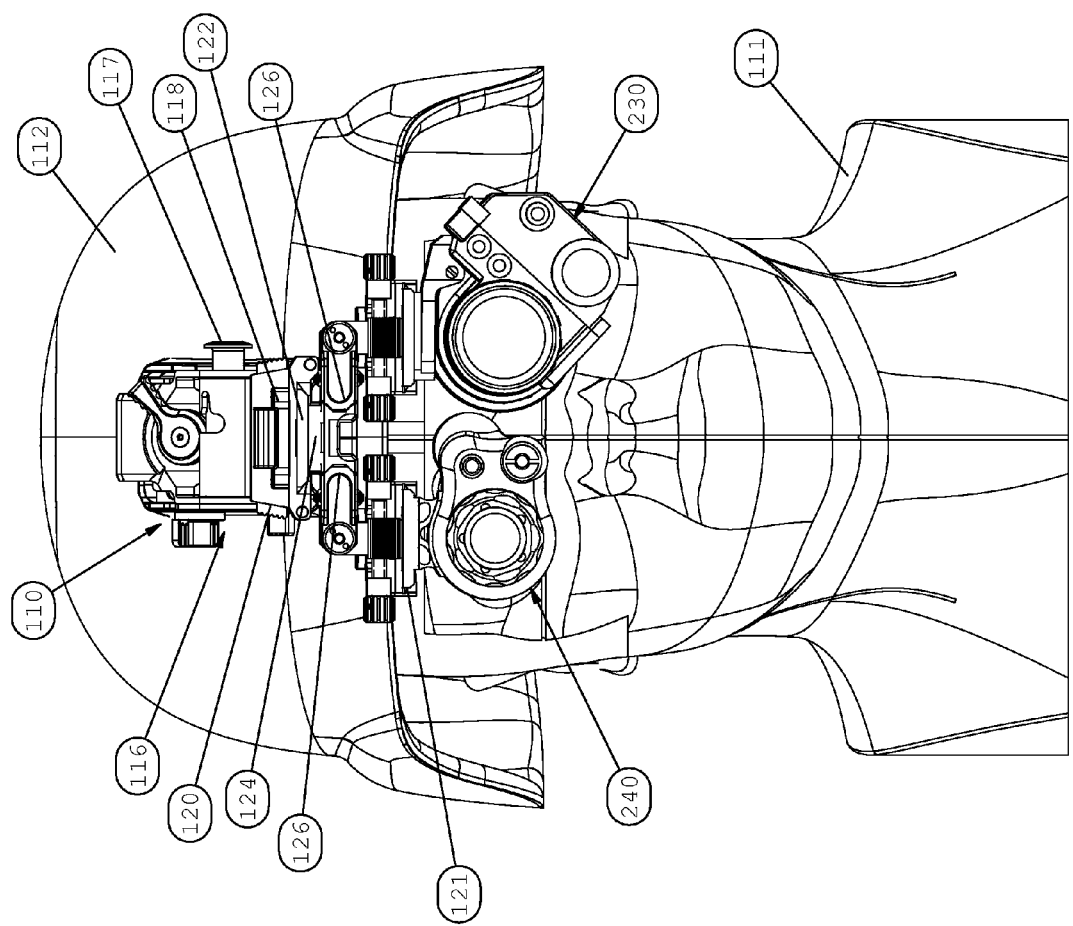
FIG. 3 is a front view of the embodiment appearing in FIG. 1.
Figure 4:
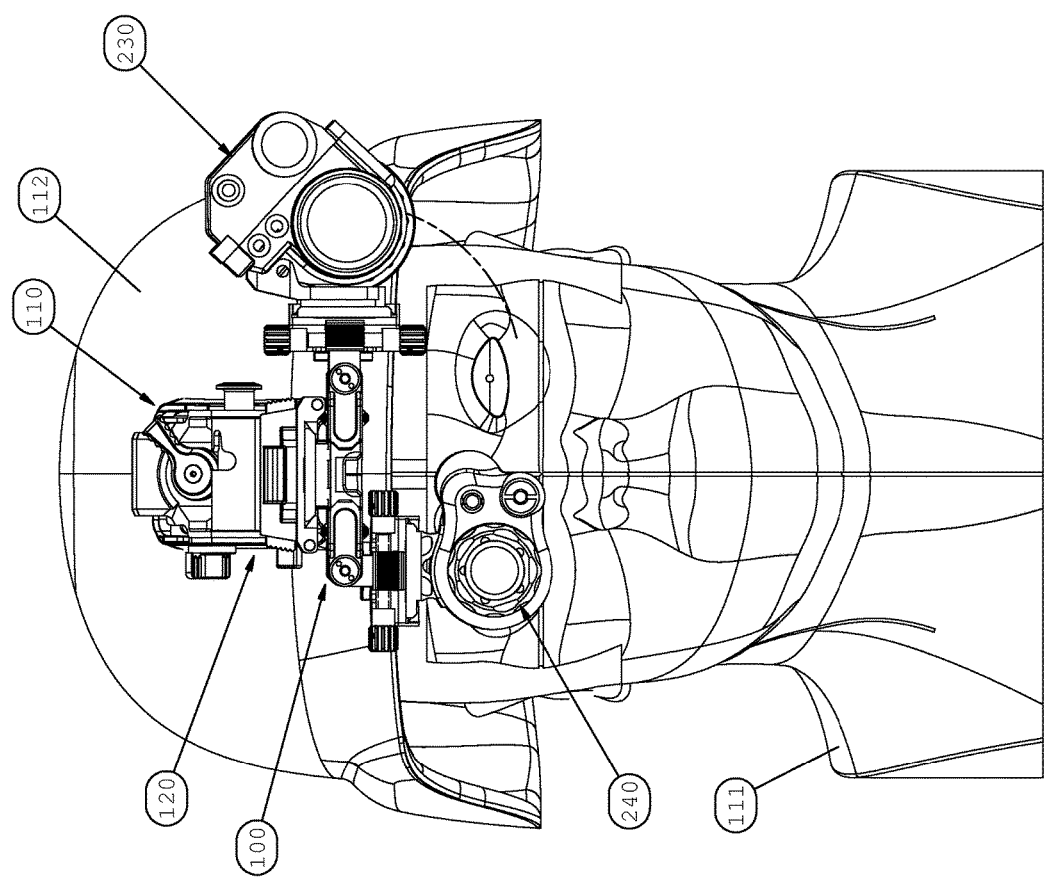
FIG. 4 is a front view of the embodiment appearing in FIG. 1, wherein the left viewing device (from the perspective of the wearer) is pivoted out of the line of sight of the viewer.
Figure 5:
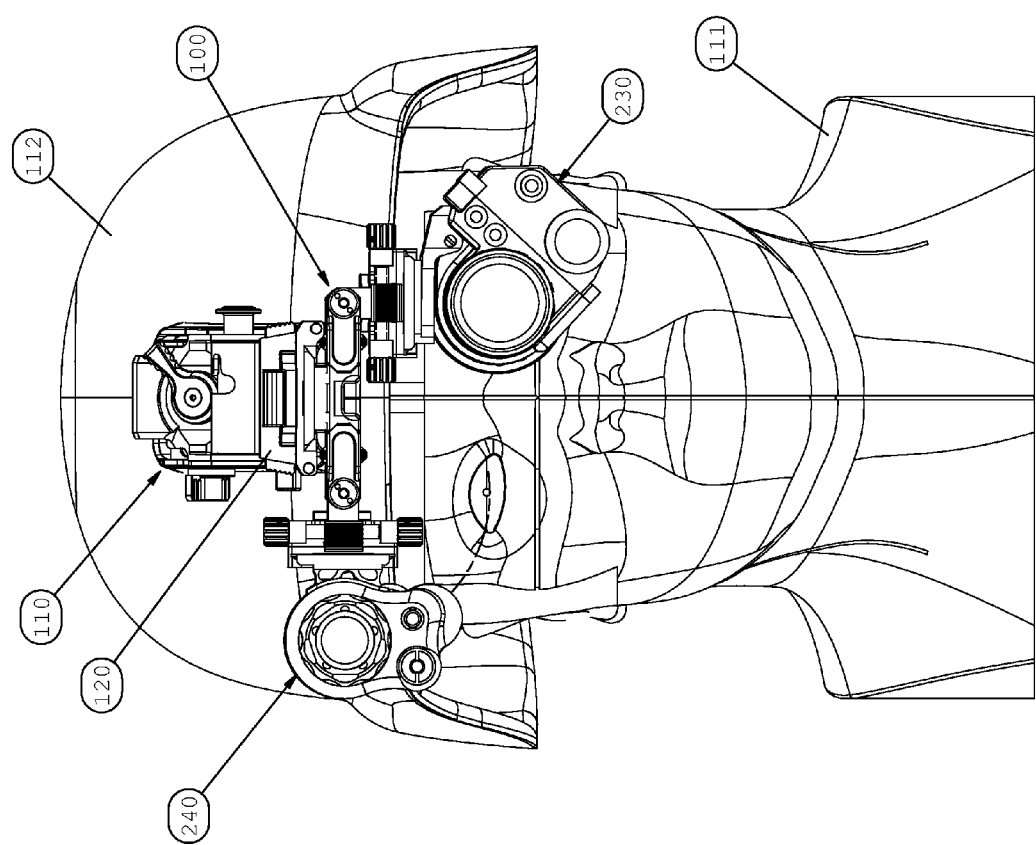
FIG. 5 is a front view of the embodiment appearing in FIG. 1, wherein the right viewing device is pivoted out of the line of sight of the viewer.
Figure 6:
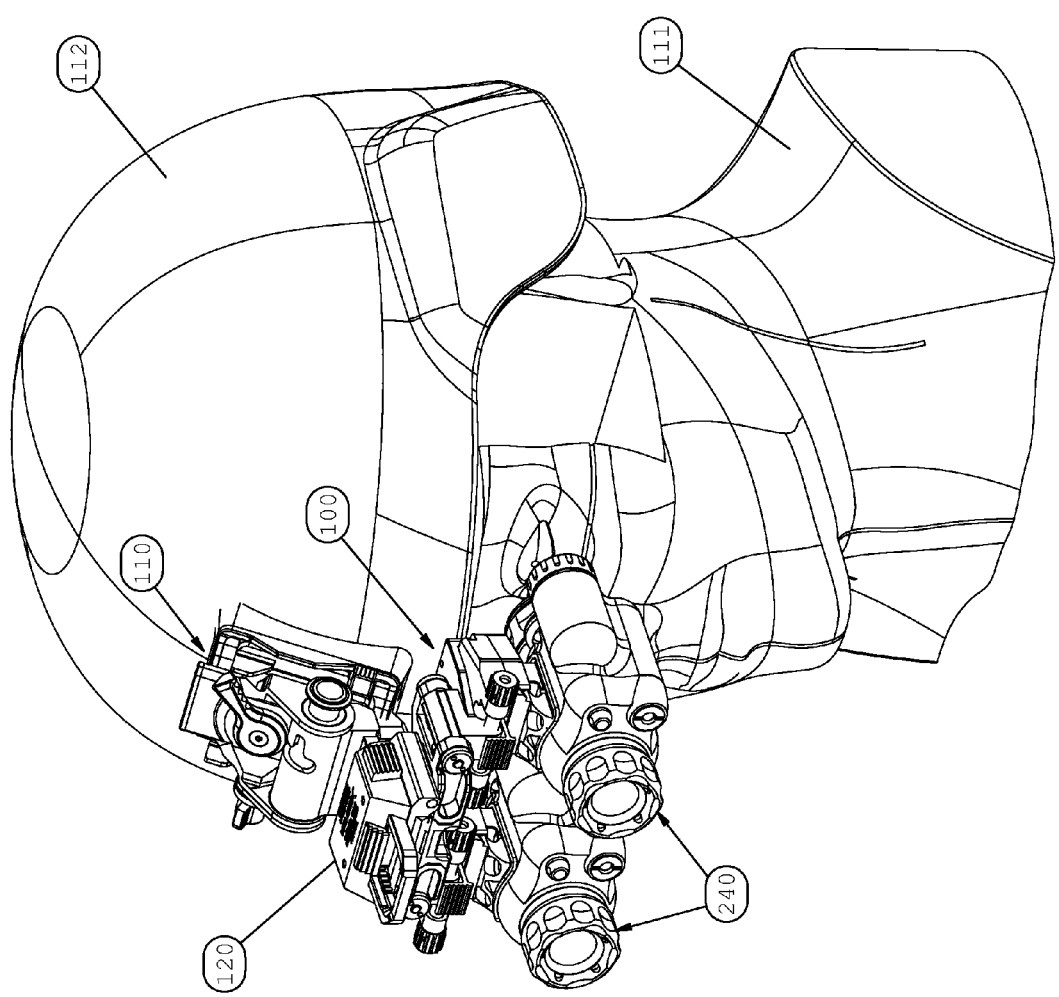
FIG. 6 is an isometric view of the helmet mount herein used in conjunction with a pair of thermal camera devices.
Figure 7:
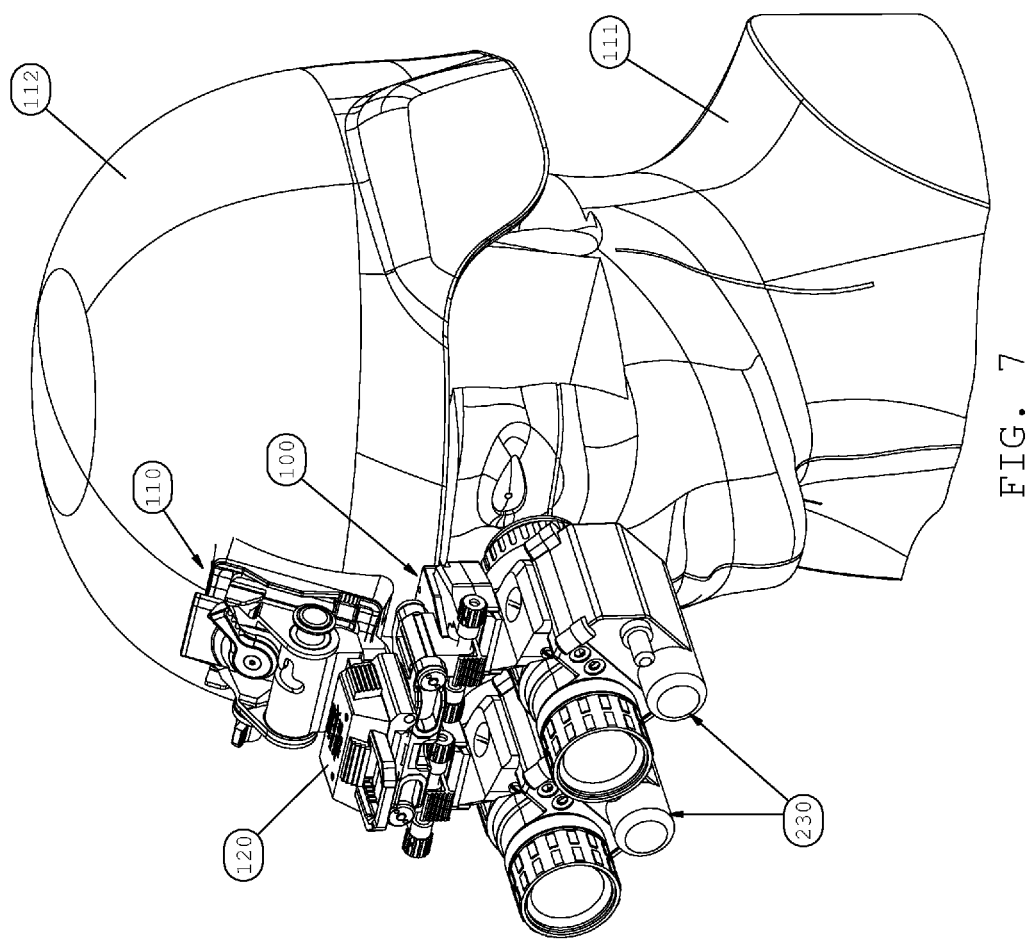
FIG. 7 is an isometric view of the helmet mount herein used in conjunction with a pair of night vision monocular devices.
Figure 12:
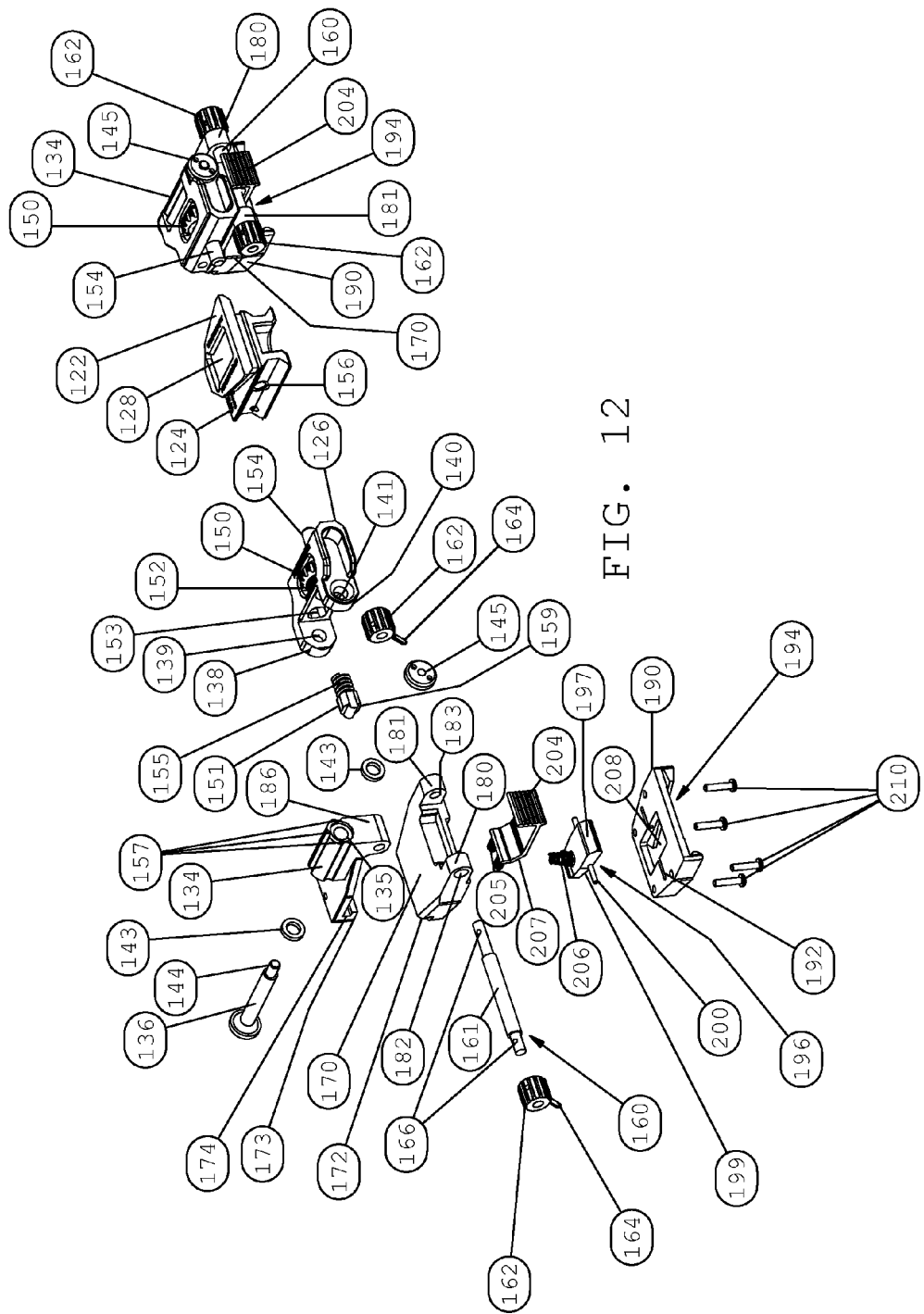
FIG. 12 is an exploded isometric view of the bridge unit embodiment herein.
Figure 14:
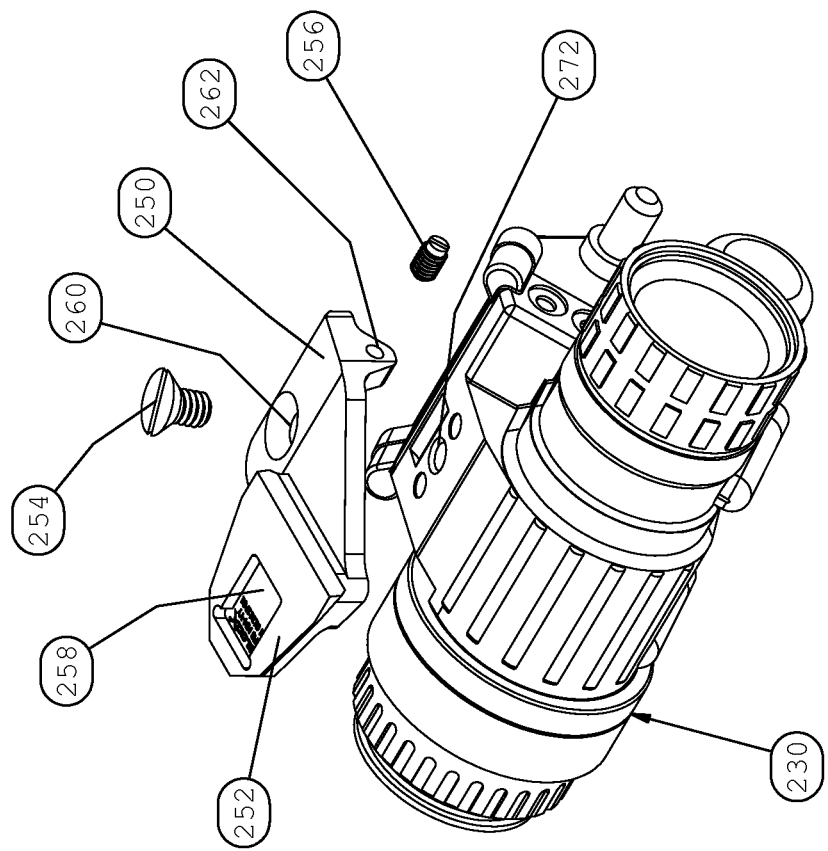
FIG. 14 is an exploded view of the thermal sight and mounting shoe adapter appearing in FIG. 10.
Figure 13:
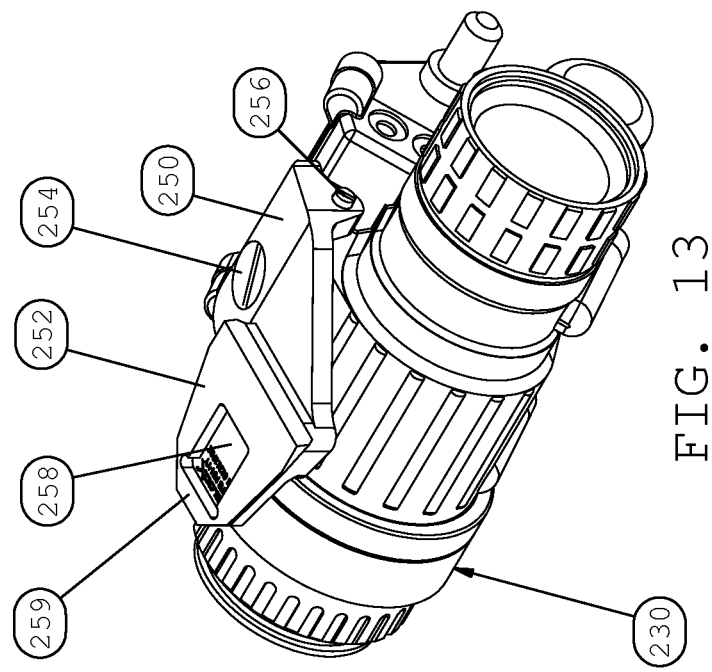
FIG. 13 is an isometric view of a thermal sight having a mounting shoe adapter for use with the binocular bridge unit herein.

Referring now to the drawings, wherein like reference numerals refer to like or analogous components throughout the several views, FIGS. 1-5 depict an exemplary bridge unit 100 employed with an exemplary helmet mounting system 110 attached to a helmet 112 to position optical devices 230 (e.g., thermal camera or sight in the illustrated embodiments) and 240 (e.g., a night vision device as shown in FIGS. 2-4) before the left and right eyes, respectively, of a user. FIG. 6 depicts the bridge unit 100 herein employed with a pair of thermal devices 230. FIG. 7 depicts the bridge unit 100 having a pair of night vision monocular devices 240. The helmet mounting system 110 may be as described in the commonly owned U.S. Pat. No. 7,219,370, incorporated herein by reference in its entirety, or other helmet mounting system as known to those skilled in the art.

The helmet mounting system 110 includes a bracket 114 attached to the front portion of the helmet 112. A first pivoting segment 116 is removably attached to the bracket 114 and may include a vertical adjustment mechanism for positioning the devices 230, 240, a breakaway mechanism e.g., in which the segment 116 (or a portion thereof) will release upon application of a predetermined force, tilt adjustment mechanism for adjusting the angle of the optical axis of the viewing devices, and so forth.

A second pivoting segment 118 is pivotally attached to the first pivoting segment 116 about a pivot axis or cylinder 117. The second segment 118 comprises rails having a sliding carriage 120 which provides a fore-and-aft adjustment mechanism for positioning the devices 230, 240 at a desired position in front of the user's eyes. Pivoting movement of the second segment 118 relative to the first segment 116 allows a wearer 111 to selectively move the viewing devices between the deployed position shown in FIGS. 1-4 to a stowed position wherein the viewing devices are pivoted up and out of the user's line of sight.

As best seen in FIGS. 8-12, the bridge unit 100 comprises three main sections, including a center section 124, and left and right sections 126. The center section 124 includes a mounting shoe 122 for engaging a complimentary receptacle 121 on the lower surface of the sliding carriage 120 (see FIG. 2). The shoe 122 includes a recess 128 on its upper surface, which receives a resilient or spring biased protrusion in the receptacle 121 for providing releasable retention of the shoe 122 within the receptacle 121. The contacting surfaces of the center section 124 and the respective side sections 126 are angled or tapered, or otherwise keyed to provide stability and prevent wobbling when in use.

The left and right sections 126 are attached to the center section 124 on opposite transverse sides thereof and are generally arranged as mirror images of each other. The sections 126 are secured to the center section via a threaded member 154 which rotatably engages an opening 156 in the center section 124. A wheel 150 is received within opening 152 in the side section 126 and is attached to the threaded member 154. Manually rotating the wheel 150 allows the side section 126 to selectively be removed from and secured to the center section 124.

The side section 126 includes a pair of spaced apart arms 138, 140 opposite the center section 124. A hinge member 134 is received between the arms 138, 140. A hinge pin 136 passes through openings 139 and 141 in the arms 138, 140 and an opening 135 in the hinge member 134. Washers 143 are disposed on each side of the hinge member 134 and a nut 145 engages a threaded end 144 of the hinge pin 136. The hinge member 134 includes a downward projection 186 having a transverse bore 188. A hook 173 defining a transverse channel or groove 174 faces and is spaced apart from the projection 186.

A resilient protrusion 151 is received with an opening 153 in the section 126 and is biased toward the hinge member 134 via a spring 155. The protrusion 151 removably engages complimentary or like-dimensioned axial grooves or channels 157 on the hinge member 134. A plurality of grooves 157 are angularly spaced about the pivot axis 136 to secure the device mount 220 at a plurality of rotational positions. The protrusion 151 preferably has a rounded edge 159 to facilitate movement of the protrusion into and out of the grooves 157 responsive to manual pivoting of the viewing device about the hinge member 134.

A laterally adjustable viewing device mount 220 is attached to the hinge member 134, wherein outward pivoting of each of the left and right hinge members 134 about the pivot pin 136 allows each of the attached viewing devices 230, 240 to be moved to a non-viewing position when not in use. Each device 230, 240 can be pivoted independently of the other and without the need to pivot the second segment 118 of the helmet mount 110. For example, FIG. 5 shows an exemplary system wherein the thermal device 230 is deployed and the NVG device 240 is pivoted up and out of the user's line of sight about the pivot pin 136. FIG. 4 shows the system wherein the NVG device 240 is deployed and the thermal device 230 is pivoted up and out of the user's line of sight about the pivot pin 136. In other configurations, both devices 230, 240 could be pivoted about the pin 136 when not in use. Pivoting the second segment 118 relative to the first segment 116 in this configuration provides a further stowage option which serves to reduce neck strain of the user by moving the devices 230, 240 further back over the helmet 112. As noted above, the attached devices could be the same wherein the present system allows for selective monocular and binocular use of like viewing devices.

The mount 220 includes an upper shell 170 and a lower shell 190, which together define an enclosure that houses one or more springs 206 and a locking tab 196. The upper and lower shells are secured via threaded fasteners 210. The upper shell includes a lip 172 which is received in the groove 174 on the hinge member 134. Set screws 176 are provided to secure the lip 172 within the groove 174.

A pair of spaced apart arms 180, 181 is formed on the upper shell 170 and the projection 186 is received therebetween. A lateral adjustment rod 160 is received through openings 182 and 183 in the respective arms 180 and 181 and through the bore 188. The rod 160 includes a threaded section 161 which engages female threads in the bore 188. Lateral adjustment knobs 162 are secured to opposite ends of the rod 160 via pins, set screws, or the like 164 engaging openings 166 formed near the ends of the rod 160.

In this manner, manual rotation of the adjustment rod using the knobs 162 in one direction causes lateral movement of the device mount 220 in one direction and rotation of the rod 160 in the opposite direction causes movement in the device mount 220 in the opposite lateral direction. In contrast to prior art binocular devices that rely on pivoting movement of the viewing devices to provide a desired interpupillary spacing, the present invention provides linear side-to-side adjustment. This is advantageous for thermographic imaging devices or other display-based devices where a pivoting interpupillary adjustment mechanism would cause an undesired rotation of the viewing screen. FIG. 8 illustrates the bridge unit 100 wherein the adjustment rod 160 is generally centered. FIG. 9 illustrates the bridge unit 100 wherein the adjustment rod 160 is generally is moved to the outermost position. In this manner, the viewing device can be adjusted to any of a wide range of pupillary positions/interpupillary spacings.

The lower housing shell 190 includes an aperture 208 receiving the tab 196. The tab 196 includes a forward portion 197 having inclined or ramped surface on one side of the pivot pins 200 and a rearward locking face portion 199 on the opposite side of the pivot pins 200. The locking face portion 199 is biased toward the opening 208 via spring 206 and extends into a dove tail receptacle 194 that is adapted to receive a mounting shoe 252 (see FIG. 10) of a viewing device 230, 240. The lower shell 190 includes a channel 192 which rotatably receives pivot pins 200 attached to the tab 196.

In operation, the mounting shoe 252 is inserted into the receptacle 194 past forward edge 197 on one side of the pivot pins 200. Once the rearward edge 259 of the shoe 252 has moved past the tab 196, the bias of the spring 206 urges the locking face of tab 196 into a recess 258 formed on the mounting shoe 252 to provide positive retention of the viewing device. A release button 204 includes one or more springs 205 to bias the release button 204 away from the locking tab 196. To release the viewing device from the mount 220, the release button 204 is manually pressed inward against the bias of the springs 205. The button member 204 includes an inclined surface 207 which engages the inclined surface on the forward edge 197 on the locking tab to pivot the locking tab 196 about the pins 200 against the urging of the spring 206. The pivoting movement of the locking tab 196 lifts the locking face portion tab 196 out of the recess 258, thereby allowing the shoe 252 to slide freely out of the receptacle 194.

Referring now to FIGS. 13-16, there is shown an adapter 250 which may be used to adapt a viewing device such as the thermal sight 230 for use with the bridge unit 100. The adapter 250 includes the shoe 252 and an opening 260. A threaded fastener 254 is received through the opening 260 and engages a threaded opening 272 in the housing of the device 230. Threaded fastener 256 engages openings 262 to provide rigid retention of the mounting shoe adapter 250 on the device 230.

Figure 17:
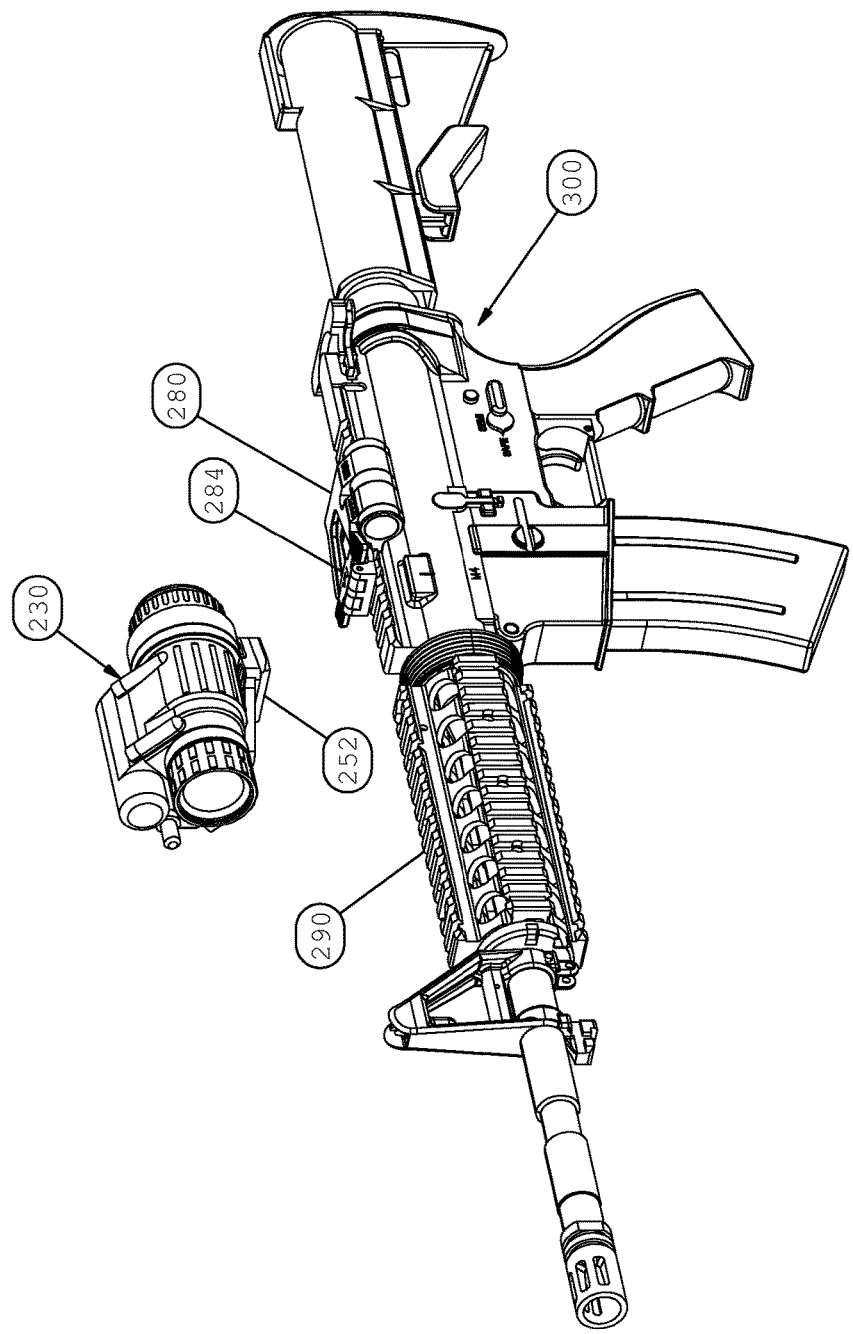
FIG. 17 illustrates the manner in which a viewing device with the present adapter unit may be removed from the bridge unit herein for mounting on a firearm.

The adapter 250 also allows a viewing device, e.g., device 230 or 240 to be attached to a firearm. Referring now to FIG. 17, there is shown a rail mount adapter 280 having a rail clamp for a rail firearm interface, such a Picatinny (e.g., MIL-STD-1913 or equivalent) rail system 290 of a military assault rifle 300. The adapter 280 includes a dovetail receptacle 284 receiving the mounting shoe 252 of the adapter 250 attached to the thermal device 230, thereby allowing the device 230 to be used interchangeably as a helmet mounted device and a thermal firearm sight.

The invention has been described with reference to the preferred embodiments. Modifications and alterations will occur to others upon a reading and understanding of the preceding detailed description. It is intended that the invention be construed as including all such modifications and alterations.

What is claimed is:

1. A bridge mount assembly for mounting a viewing device to a helmet, the bridge mount assembly comprising:
    a center section, wherein said center section comprises a mounting shoe, wherein the mounting shoe is configured to slidably and removably mate with a mounting shoe receiver attached to the helmet;
    a bridge mounting member removably attachable to the center section, the bridge mounting member configured to attach the viewing device to the bridge mount assembly, the bridge mounting member including a mounting shoe receptacle that is movable laterally along a horizontal axis; and
    an adapter having a fastener and an adapter shoe, wherein the fastener provides rigid retention of the adapter on the viewing device, and wherein the adapter shoe is configured for removable and interchangeable attachment to the mounting shoe receptacle and to a rail mount adapter attached to a firearm rail interface;
    wherein the bridge mounting member comprises a hinge member that allows rotation of the viewing device around a pivot axis and wherein the pivot axis is parallel to an optical axis of the viewing device.

2. The bridge mount assembly of claim 1, wherein the hinge member includes a plurality of recesses spaced about the pivot axis, each recess configured to removably receive a resilient protrusion in the bridge mounting member to secure an attached viewing device at one of a corresponding plurality of fixed rotational positions about the pivot axis.

3. The bridge mount assembly of claim 1, comprising first and second bridge mounting members for attachment of first and second viewing devices.

4. The bridge mount assembly of claim 3, wherein the first bridge mounting member includes a first mounting shoe receptacle and the second bridge mounting member includes a second mounting shoe receptacle, and wherein the first mounting shoe receptacle is movable laterally along a horizontal axis independently of the second mounting shoe receptacle.

5. The bridge mount assembly of claim 1, wherein the center section is disposed in a central portion of the assembly and is adapted to mate with a bridge mounting member at the left and/or right side of the center section.

6. The bridge mount assembly of claim 1, wherein the bridge mounting member includes a transversely-extending adjustment rod having external helical threads rotatably engaging an internally threaded opening, wherein rotation of the adjustment rod in a first direction of rotation causes transverse movement of the mounting shoe receptacle in a first transverse direction and rotation of the adjustment rod in a second direction of rotation opposite the first direction of rotation causes transverse movement of the mounting shoe receptacle in a second transverse direction opposite the first transverse direction.

7. The bridge mount assembly of claim 1, wherein the mounting shoe receptacle is adapted to removably receive a mounting shoe on the viewing device.

8. The bridge mount assembly of claim 6, wherein the mounting shoe receptacle comprises a biased pressure foot that is pushed into a recess in the mounting shoe.

9. The bridge assembly of claim 8, wherein pressure is applied to the pressure foot via a spring received within the mounting shoe receptacle.

10. The bridge assembly of claim 9, further comprising a release lever mechanically coupled to the pressure foot for moving the pressure foot out of engagement with the recess against the bias of the spring.

11. The bridge assembly of claim 1, further comprising a viewing device, wherein said viewing device is selected from the group consisting of an optical device, opto-electronic device, sighting device, targeting device, night vision goggle device, enhanced night vision goggle device, thermal imaging device, infrared imaging device, short-wave infrared imaging device, helmet mounted display screen, and any combination thereof.

12. An optical bridge-helmet mount assembly comprising:
    a bridge mount assembly for mounting a viewing device to a helmet, the bridge mount assembly comprising a center section, wherein said center section comprises a mounting shoe, and a bridge mounting member removably attachable to the center section, wherein the mounting shoe is configured to slidably and removably mate with a mounting shoe receiver attached to the helmet, the bridge mounting member configured to attach the viewing device to the bridge mount assembly, the bridge mounting member including a mounting shoe receptacle that is movable laterally along a horizontal axis, wherein the bridge mounting member comprises a hinge member that allows rotation of the viewing device around a pivot axis and wherein the pivot axis is parallel to an optical axis of the viewing device; and
    an adapter having a fastener and an adapter shoe, wherein the fastener provides rigid retention of the adapter on the viewing device, and wherein the adapter shoe is configured for removable and interchangeable attachment to the mounting shoe receptacle and to a rail mount adapter attached to a firearm rail interface; and
    wherein the adapter also allows the viewing device to be attached to a firearm; and a helmet mount assembly that connects the bridge mount assembly to the helmet.

13. The optical bridge-helmet mount assembly of claim 12, wherein the helmet mount assembly comprises a pivot assembly for pivoting the bridge mount assembly to be pivoted between a lower position and an upper position for use and stowage, respectively, of a viewing device attached to the bridge mount assembly.

14. The optical bridge-helmet mount assembly of claim 12, wherein the helmet mount assembly comprises a vertical adjustment mechanism.

15. The optical bridge-helmet mount assembly of claim 12, wherein the helmet mount assembly comprises one or both of a tilt adjustment mechanism and a fore-and-aft adjustment mechanism.

16. The optical bridge-helmet mount assembly of claim 12, further comprising a breakaway connector which causes the helmet mount assembly to detach from the helmet upon the application of a predetermined force.

17. A system comprising:
    a bridge mount assembly for mounting a viewing device to a helmet, the bridge mount assembly comprising a center section, wherein said center section comprises a mounting shoe, and a bridge mounting member removably attachable to the center section, wherein the mounting shoe is configured to slidably and removably mate with a mounting shoe receiver attached to the helmet, the bridge mounting member configured to attach the viewing device to the bridge mount assembly, the bridge mounting member including a mounting shoe receptacle that is movable laterally along a horizontal axis, wherein the bridge mounting member comprises a hinge member that allows rotation of the viewing device around a pivot axis and wherein the pivot axis is parallel to an optical axis of the viewing device;

an adapter having a fastener and an adapter shoe, wherein the fastener provides rigid retention of the adapter on the viewing device, and wherein the adapter shoe is configured for removable and interchangeable attachment to the mounting shoe receptacle and to a rail mount adapter attached to a firearm rail interface;

a helmet mount assembly that connects the bridge mount assembly to the helmet; and the viewing device.

18. The system of claim 17, wherein the viewing device is selected from the group consisting of an optical device, opto-electronic device, sighting device, targeting device, night vision goggle device, enhanced night vision goggle device, thermal imaging device, infrared imaging device, short-wave infrared imaging device, helmet mounted display screen, and any combination thereof.

* * * * *